(12) United States Patent
Li

(10) Patent No.: US 6,354,558 B1
(45) Date of Patent: Mar. 12, 2002

(54) COMPRESSOR MOUNTING

(75) Inventor: Wenlong Li, Fayetteville, NY (US)

(73) Assignee: Carrier Corporation, Syracuse, NY (US)

( * ) Notice: Subject to any disclaimer, the term of this patent is extended or adjusted under 35 U.S.C. 154(b) by 0 days.

(21) Appl. No.: 09/196,587

(22) Filed: Nov. 20, 1998

(51) Int. Cl.[7] .............................................. F16M 13/00
(52) U.S. Cl. ...................... 248/615; 248/673; 248/677; 248/638; 417/360; 267/141
(58) Field of Search ................. 248/638, 677, 248/673, 634, 635, 615; 267/141, 153, 293; 417/363, 360

(56) References Cited

U.S. PATENT DOCUMENTS

| | | | |
|---|---|---|---|
| 1,744,009 A | * 1/1930 | Parker | 248/634 |
| 2,138,176 A | * 11/1938 | Keys | 248/613 |
| 2,520,757 A | * 8/1950 | Cain | 248/632 |
| 2,685,178 A | * 8/1954 | Eck | 62/295 |
| 4,306,708 A | * 12/1981 | Gassaway et al. | 267/141.3 |
| 4,461,446 A | * 7/1984 | Hannibal et al. | 248/634 |
| 5,174,540 A | * 12/1992 | Gilliam | 248/635 |
| 5,221,192 A | * 6/1993 | Heflin et al. | 417/363 |
| 5,277,554 A | * 1/1994 | Elson | 417/363 |
| 5,306,121 A | * 4/1994 | Heflin et al. | 417/363 |
| 5,810,322 A | * 9/1998 | Zhao et al. | 248/675 |
| 5,964,579 A | * 10/1999 | Tang et al. | 417/363 |
| 6,029,942 A | * 2/2000 | Daddis, Jr. et al. | 248/635 |
| 6,132,183 A | * 10/2000 | Li et al. | 417/363 |

FOREIGN PATENT DOCUMENTS

| | | | |
|---|---|---|---|
| CA | 464558 | * 4/1950 | 248/634 |
| FR | 48307 | * 7/1983 | 248/635 |

* cited by examiner

*Primary Examiner*—Leslie A. Braun
*Assistant Examiner*—Naschica S. Morrison

(57) ABSTRACT

The base pan of a refrigeration, air conditioning or heat pump is overlain by a series of assemblies each serially including a grommet, a compressor foot or base and, optionally, a washer or the like. A stud or bolt extending through each assembly secures the respective assembly to the base pan. The grommets are each received in recesses defined by a lip or rim formed on a compressor foot such that the grommets are exteriorly, peripherally or circumferentially engaged by the lip or rim so as to resist transverse motion of the compressor. The grommets are preferably located entirely between the compressor foot or base and the base pan. The grommets have different wall thicknesses at different axial and/or circumferential locations.

6 Claims, 3 Drawing Sheets

COMPRESSOR MOUNTING

BACKGROUND OF THE INVENTION

Compressors used in refrigeration, air conditioning and heat pump systems are normally mounted to the associated base pan through a vibration isolating mounting assembly. Specifically, compressors are commonly mounted to the base pan of the condensing or outdoor unit. In such an installation, it is desirable to damp vibrations and the resultant noise caused by operation of the compressor. A common arrangement is to locate elastomeric grommets between the base or feet of the compressor and the base pan upon which it is mounted. The grommets have lips and necks which permit their insertion into openings in the base or feet of the compressor which generally correspond to the neck dimensions. The compressor, with attached grommets, is set on the base pan which has a plurality of threaded studs secured thereto. The threaded studs are then pushed through the grommets as the compressor is set on the base pan. Nuts are threaded to the studs to secure the connection.

The grommets support the weight of the compressor and are radially spaced from the center of gravity of the compressor to prevent it from tipping. While the spaced supports provide stability, they also increase the torsional restoring forces due to their distance from the axis of rotation. The grommets serve to vibrationally and acoustically isolate the compressor from its support. The resonance frequencies of the compressor torsional and rocking modes are inherently high in such a mounting arrangement, tending to fall into the proximity of the compressor speed and to cause vibration and noise problems. To alleviate these problems, the grommets are normally made very soft in the transverse directions which may result in excessive movement during shipping causing damage to the piping and/or coils in the system. Because movement of the compressor base or feet is a shearing or cutting movement relative to the necks of the grommets, their weakest point, damage may occur to the grommets. Besides being vulnerable to damage, installation is difficult due to the grommet lips, and the neck represents a small clearance between the compressor foot and the studs such that a short circuit for vibration can be created upon the cutting of the neck.

In addition to vibrationally and acoustically isolating the compressor from its support during operation, they also cushion the compressor during shipping. Tipping, dropping and the like can subject the compressor to forces and magnitudes of forces not encountered in normal operation. Upon severe tipping, or the like, the lip, or a portion thereof, may be pulled through the compressor base or foot such that the isolator will be subsequently damaged and/or ineffective.

SUMMARY OF THE INVENTION

The grommets of the compressor mounting assembly are preferably made without necks but, if present, can be made larger and with a clearance around the necks since the grommets are received and engaged, at the location of their greatest radial extent, in annular recesses in the compressor feet or base. With the elimination of the lips or heads due to the elimination of the necks, rubber washers, or the like, may be optionally located between the compressor feet or base and the nuts on the studs holding the assembly in place during shipping. If rubber washers, or the like, are not used, the spacing between the compressor feet and the nuts must be less than the depth of the annular recesses such that the grommets will not be withdrawn from the recesses as when tipping occurs.

It is an object of this invention to facilitate grommet installation.

It is another object of this invention to reduce isolator failure due to cutting of the grommets.

It is a further object of this invention to reduce forces transmitted to the base pan from a compressor.

It is another object of this invention to attenuate compressor generated sound.

It is a further object of this invention to provide improved vibration isolation of a compressor. These objects, and others as will become apparent hereinafter, are accomplished by the present invention.

Basically, the base pan of a refrigeration, air conditioning or heat pump system is overlain by a series of assemblies each serially including a grommet, a compressor foot or base and, optionally, a washer or the like. The compressor foot or base defines a plurality of recesses for receiving one end of each grommet and are of such a depth as to retain the grommets when the compressor is subject to tipping or the like. A stud or bolt extending through each assembly, and coacting with a nut, secures the respective assembly to the base pan.

BRIEF DESCRIPTION OF THE DRAWINGS

For a fuller understanding of the present invention, reference should now be made to the following detailed description thereof taken in conjunction with the accompanying drawings wherein.

DESCRIPTION OF THE PREFERRED EMBODIMENTS

Figure 1:
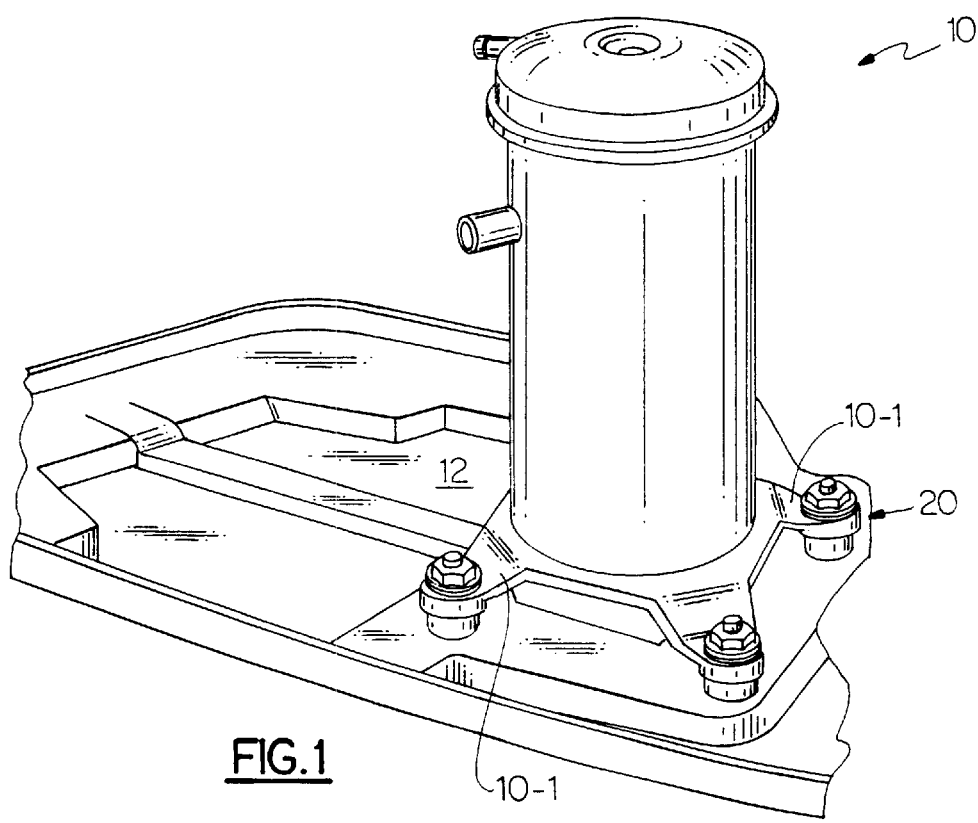
FIG. 1 is a pictorial view of a compressor mounted to a base pan according to the teachings of the present invention.

In FIG. 1, the numeral 10 generally designates a vertical hermetic compressor having a plurality of feet 10-1. Compressor 10 is secured to base pan 12 via a plurality of compressor mountings 20 which vibrationally isolate compressor 10 from base pan 12 during operation and cushion compressor 10 during shipping. The vibrational isolation is due to the fact that compressor feet 10-1 are not in metal-to-metal contact with any other structure.

Figure 2:
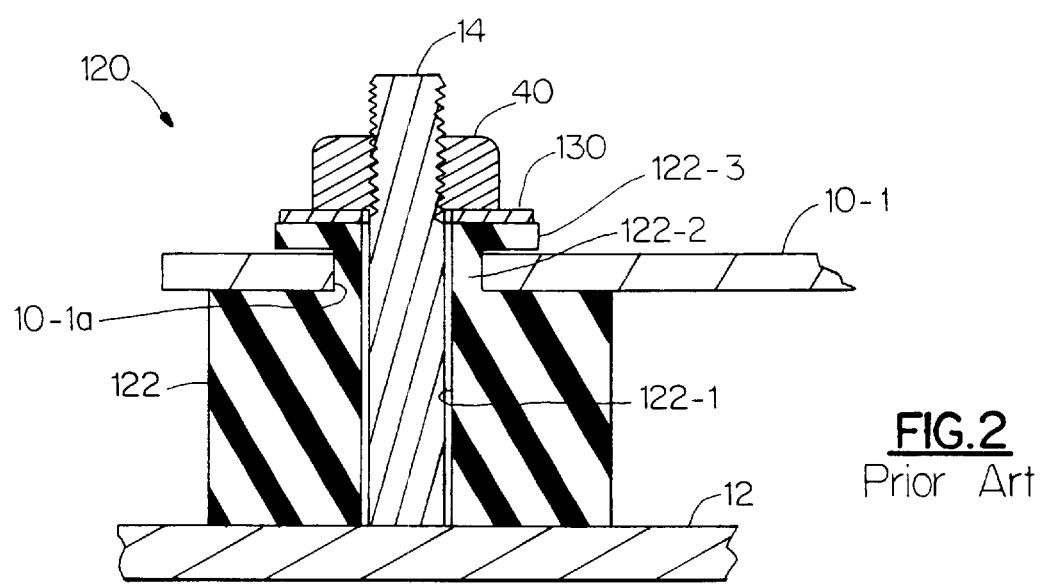
FIG. 2 is a sectional view of a PRIOR ART compressor mounting assembly.

FIG. 2 illustrates a PRIOR ART compressor mounting 120. Grommet 122 is made of a resilient material, such as rubber, and has a bore 122-1, a neck portion 122-2 and a lip portion 122-3. Lip portion 122-3 is forced through opening 10-1a of compressor foot 10-1 such that neck portion 122-2 is located in opening 10-1a when the grommet 122 is in place relative to compressor foot 10-1. With grommets 122 in place in the feet 10-1 of a compressor, the grommets 122 are placed such that threaded studs 14 extend through bores 122-1. A washer 130 is placed over stud 14 followed by nut 40 which is treaded onto stud 14 such that it engages washer 130 which, in turn engages the lip 122-3 of grommet 122 such that compressor feet 10-1 are secured to base pan 12. Because neck portion 122-2 is the smallest diameter portion of grommet 122 and is received in opening 10-1a, the weakest structure is located in a location where it is most easily cut.

Figure 3:
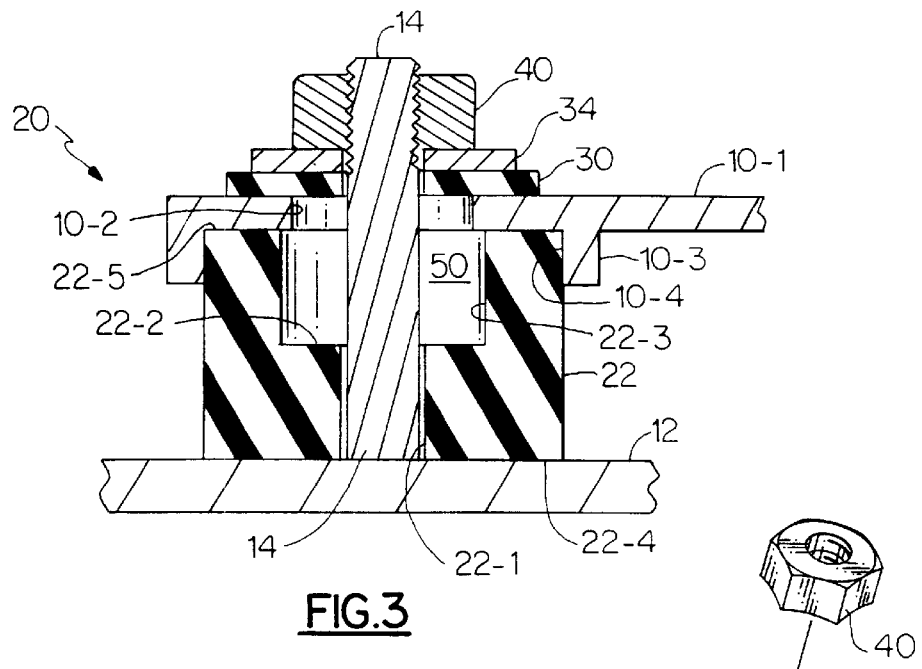
FIG. 3 is a sectional view of a compressor mounting assembly according to the teachings of the present invention.
Figure 4:
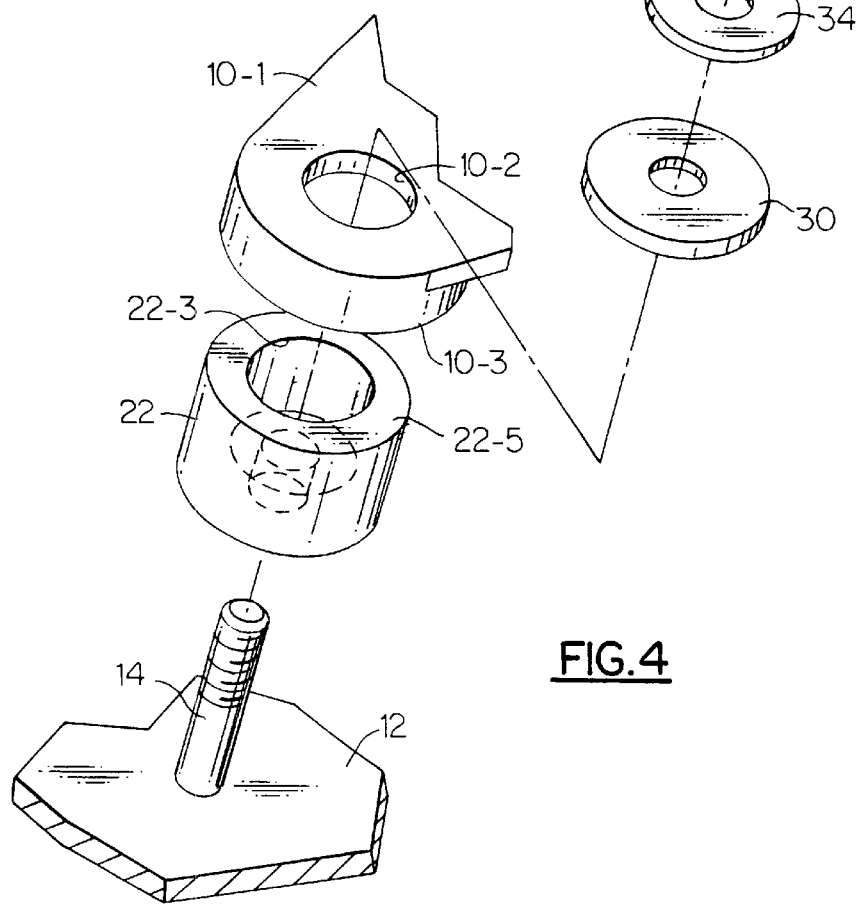
FIG. 4 is an exploded view of the compressor mounting assembly of FIG. 3.

Referring specifically to FIGS. 3 and 4, threaded stud 14 is welded or otherwise suitably secured to base pan 12. Grommet 22 is made of a resilient material, such as rubber, and has a first bore 22-1 and a second bore 22-3 with shoulder 22-2 therebetween. Bore 22-1 receives stud 14 and the bottom 22-4 of grommet 22 rests on base pan 12 when compressor mounting 20 is assembled. Compressor foot 10-1 has an opening 10-2 for loosely receiving stud 14 and a downwardly extending annular lip or rim 10-3 defining bore or recess 10-4 for snugly receiving and circumferentially securing the top portion 22-5 of grommet 22 when compressor mounting 20 is assembled. Rubber washer 30 and metal washer 34, if present, overlie compressor foot 10-1 and receive threaded stud 14. Nut 40 threadedly receives threaded stud 14 and secures grommet 22 in engagement with base pan 12 and with top portion 22-5 received in the bore or recess 10-4 defined by annular lip or rim 10-3. The grommets 22 support the weight of compressor 10. It will be noted that there is an annular space 50 between stud 14 and bore 22-3. The size and shape of annular space 50 is dictated by corresponding dimensional/thickness factors which dictate the lateral and vertical stiffness of grommet 22 and therefore of compressor mounting 20. Additionally, or if desired, the outer surface of grommets 22 may be modified by providing circumferential relieved portions, axial grooves, etc. to modify the lateral and vertical stiffness.

In comparing PRIOR ART compressor mounting 120 of FIG. 2 with compressor mounting 20 of FIG. 3, a number of differences are readily apparent. First, grommet 122 extends through foot 10-1 and engages the perimeter of opening 10-1a at its least external radial extent whereas grommet 22 is entirely located between base pan 12 and compressor foot 10-1 and is engaged at its greatest external peripheral extent. If a neck and lip is formed on grommet 22 there would be a clearance with opening 10-2 and bore or recess 10-4, rather than opening 10-2, would be the structure preventing transverse movement. Second, because grommet 122 is circumferentially engaged/restrained by compressor foot 10-1 at neck 122-2, the smallest diameter portion of grommet 122, it is subject to a cutting motion by compressor foot 10-1, whereas grommet 22 is circumferentially and uniformly engaged by lip or rim 10-3, defining recess 10-4, at the fullest peripheral or circumferential extent of grommet 22. These differences make grommet 22 less likely to be damaged, more easily installed, and the length and diameter of bore 22-3 and external surface of grommet 22 can be varied to permit changes in the lateral and vertical stiffness of grommet 22.

Figure 5:
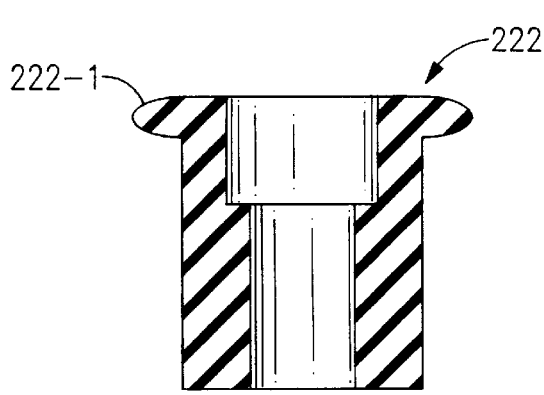
FIG. 5 is a vertical sectional view of a first modified grommet.

FIG. 5 illustrates a first modified grommet 222. Grommet 222 differs from grommet 22 in the addition of radially extending annular lip 222-1 which defines the outermost portion of grommet 222. Lip 222-1 is received in bore or recess 10-4 of lip or rim 10-3 of compressor foot 10-1 and would be the only portion of grommet 222 circumferentially engaged by rim 10-3. Lip 222-1 will nominally have an unstressed diameter the same as that of the bore or recess 10-4 and may, accordingly, be flexed in being located in bore or recess 10-4. The addition of lip 222-1 permits the independent adjustment of the radial stiffness of grommet 222 to a desired value.

Figure 6:
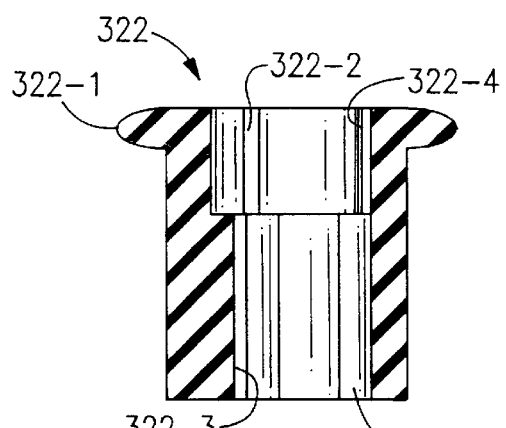
FIG. 6 is a vertical sectional view of a second modified grommet taken along line 6—6 of FIG. 7.
Figure 7:
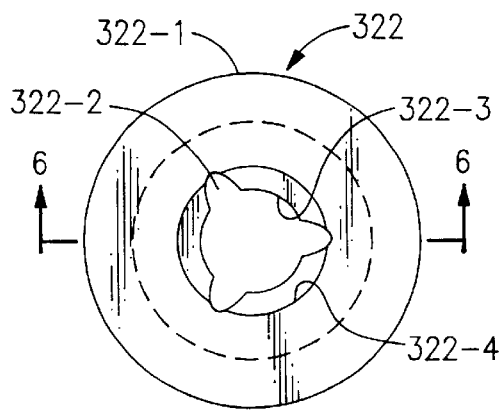
FIG. 7 is a top view of the grommet of FIG. 6.

FIGS. 6 and 7 illustrate a second modified grommet 322 which is a further modification of grommet 222. Like grommet 222, grommet 322 has a radially extending annular lip 322-1 which functions the same as lip 222-1. Additionally, grommet 322 has a plurality of axially extending grooves 322-2 which are formed in the bore 322-3 and/or bore 322-4. The function of grooves 322-2 is to change the lateral and vertical stiffness of grommet 322.

Figure 8:
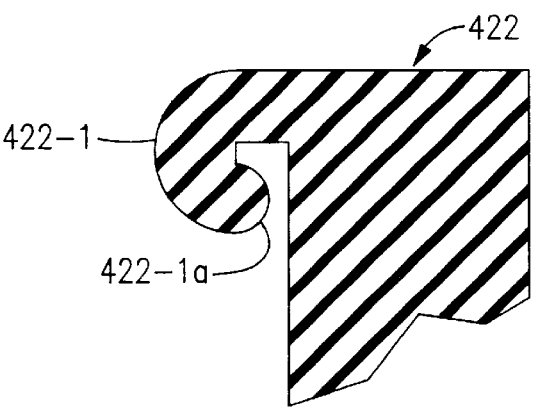
FIG. 8 is a partial, vertical sectional view of the details of a modification that can be made in the grommets of FIGS. 1 and 3–7.

FIG. 8 illustrates a grommet 422 having a modified annular lip 422-1. Lip 422-1 is of a C-shape or semi-circle in radial section. The free end 422-1a of lip 422-1 is radially spaced from the main body portion of grommet 422. Lip 422-1 can flex or be circumferentially compressed with a varying resistance. The resistance will increase when lip 422-1 engages the main body portion of grommet 422. The lower initial resistance to deformation is desired for vibration isolation under normal operating conditions and high resistance is desired to limit compressor motions during shipping.

Grommet 22 of FIGS. 3 and 4 may be modified by providing it with a lip 222-1 or 422-1 as illustrated in FIGS. 5 and 8, respectively. Additionally, or alternatively, the cross section of grommet 22 may be modified as by providing grooves 322-2, as illustrated in FIGS. 6 and 7.

Figure 9:
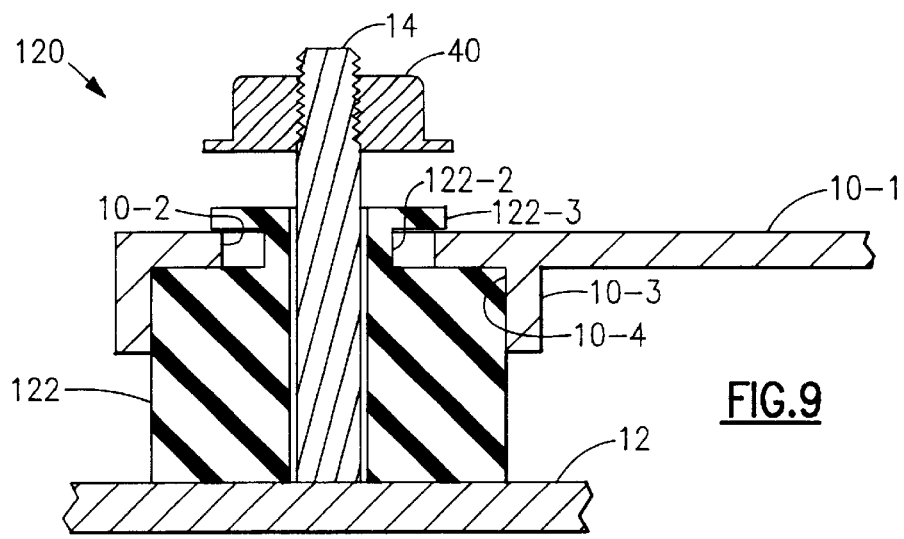
FIG. 9 is a sectional view of a compressor mounting assembly in which a PRIOR ART grommet is employed in combination with a compressor foot or base of the present invention.

Referring now to FIG. 9, the PRIOR ART grommet 122 may be used in combination with a compressor foot 10-1 having a lip or rim 10-3 defining bore or recess 10-4. Basically, FIG. 9 differs from FIG. 3 in the replacement of grommet 22 with grommet 122 and the elimination of washers 30 and 34. Because opening 102 is much larger than opening 10-1a, lip 122-3 and neck 122-2 have no significant coaction with foot 10-1 or opening 10-2. In the absence of washers 30 and 34, nut 40 is threshold to the extent permitted by the threads on stud 14 but nut 40 would be spaced from foot 10-1 a distance less than the axial extent or depth of bore or recess 10-4. Accordingly if the compressor is tipped, or the like, during shipping grommet 122 would remain in recess 10-4. Normal compressor operation would not cause contact between foot 10-1 and nut 40, even in the absence of washer 30 and 34.

Although preferred embodiments of the present invention have been described and illustrated, other changes will occur to those skilled in the art. For example, the description has been specific for a vertical compressor, but the present invention is applicable to a horizontal compressor. Also, while a round/cylindrical shape has been illustrated, the grommets may have other shapes. It is therefore intended that the scope of the present invention is to be limited only by the scope of the appended claims.

What is claimed is:

1. Means for mounting a compressor comprising:

a compressor;

means for supporting said compressor;

a plurality of grommets having first and second ends with said first ends being top portions of said grommets and having a peripheral extent;

means secured to said compressor defining a plurality of spaced recesses corresponding to said peripheral extent for receiving and engaging said first ends of said grommets;

said second ends engaging said means for supporting said compressor such that said grommets are engaged by said means for supporting and said means secured to said compressor;

means extending through said grommets and said means secured to said compressor for securing said compressor with respect to said means for supporting said compressor.

2. The means for mounting a compressor of claim 1 wherein said grommets have radially extending lip portions which define said peripheral extent at said first ends and which are received in said recesses.

3. The means for mounting a compressor of claim 2 wherein said grommets have a bore therein and have circumferentially varying radial thickness.

4. The means for mounting a compressor of claim 3 wherein said grommets have an axially varying radial thickness.

5. The means for mounting a compressor of claim 2 wherein said grommets have an axially varying thickness.

6. The means for mounting a compressor of claim 1 wherein said grommets have radially and axially extending lip portions which define said peripheral extent at said first ends and are received in said recesses.

* * * * *